United States Patent
Maiocchi et al.

(10) Patent No.: US 7,215,094 B2
(45) Date of Patent: May 8, 2007

(54) METHOD FOR SENSING THE BACK ELECTROMOTIVE FORCE INDUCED IN THE WINDING OF A VOICE COIL MOTOR

(75) Inventors: Giuseppe Maiocchi, Capiago Intimiano (IT); Ezio Galbiati, Agnadello (IT); Michele Boscolo, Chioggia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 11/381,432

(22) Filed: May 3, 2006

(65) Prior Publication Data

US 2006/0250099 A1 Nov. 9, 2006

(30) Foreign Application Priority Data

May 3, 2005 (IT) ............................ VA2005A0029

(51) Int. Cl.
*G11B 21/02* (2006.01)
(52) U.S. Cl. ........................................ 318/459; 360/75
(58) Field of Classification Search ................ 318/459, 318/461, 479, 504, 650; 360/75
See application file for complete search history.

(56) References Cited

U.S. PATENT DOCUMENTS

| 5,455,723 | A | | 10/1995 | Boutaghou et al. ............ 360/75 |
| 5,811,946 | A | * | 9/1998 | Mullin et al. ................ 318/254 |
| 6,034,496 | A | * | 3/2000 | Male .......................... 318/439 |
| 6,081,112 | A | * | 6/2000 | Carobolante et al. ........ 324/177 |
| 6,542,324 | B1 | | 4/2003 | Galbiati et al. ............... 360/75 |
| 6,563,660 | B1 | * | 5/2003 | Hirano et al. .................. 360/75 |
| 6,838,847 | B2 | * | 1/2005 | Dragoi et al. ............... 318/434 |
| 6,906,485 | B2 | * | 6/2005 | Hussein ....................... 318/439 |

* cited by examiner

*Primary Examiner*—Bentsu Ro
(74) *Attorney, Agent, or Firm*—Lisa K. Jorgenson; Allen, Dyer, Doppelt, Milbrath & Gilchrist, P.A.

(57) ABSTRACT

A method for sensing a back electromotive force induced in a winding of a voice coil electro-mechanical actuator controlled in a discontinuous mode by alternating conduction phases to off-phases includes sensing voltage at terminals of the winding during an off-phase The winding is driven during a conduction phase immediately preceding the off-phase to invert, during a final portion of the conduction phase before entering an off-phase, a direction of flow of the current through the winding.

9 Claims, 2 Drawing Sheets

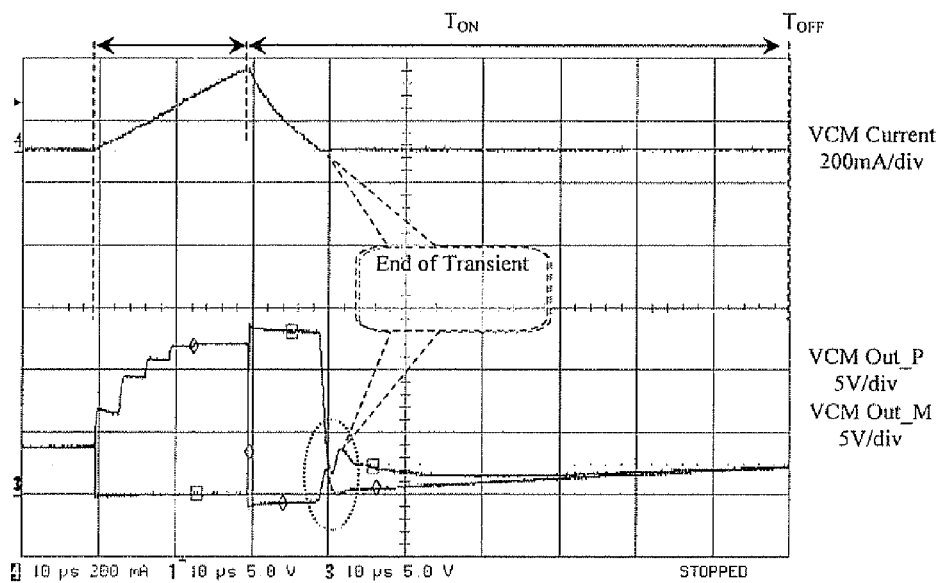
FIG. 3
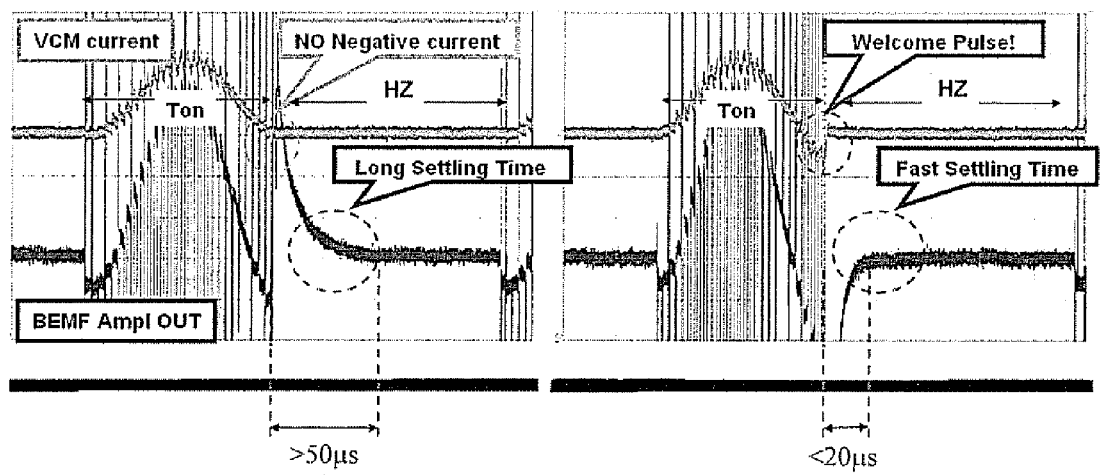
FIG. 4A
(PRIOR ART)
FIG. 4B

METHOD FOR SENSING THE BACK ELECTROMOTIVE FORCE INDUCED IN THE WINDING OF A VOICE COIL MOTOR

FIELD OF THE INVENTION

The invention relates in general to electric motors, and more particularly, to a method for sensing the back electromotive force (BEMF) induced in a winding of a voice coil motor (VCM) or other similar electro-mechanical actuator for improving control of the speed of the motor during load/unload operations of the arm that carries the read/write heads of a hard disk.

BACKGROUND OF THE INVENTION

Voice coil motors (VCM) are used in many applications. They are substantially composed of a winding placed in a magnetic field generated by a permanent magnet By forcing a certain current in the windings, a force that displaces the winding is generated. The displacement of the winding may be controlled with high precision.

Besides VCMs, there are other electro-mechanical actuators that work by exploiting this principle, such as audio loudspeakers, electro-locks, etc. Because of the wide use of VCMs, reference will be made to this class of motors, but what will be stated holds for any voice-coil like actuator VCMs are largely used for moving the arm that supports the read/write heads over the rotating disk of a hard drive, and to move it to and from a parking ramp.

The ramp unloading (parking) operation of the read/write heads is essential for preventing possible impacts with the hard disk during transportation. In fact, if the mechanical arm is subjected to strong vibrations, it could flex and the read/write heads could hit the hard disk damaging it or themselves, if not safely parked. The reverse operation, called ramp loading, is performed each time the hard disk is turned on for reading from or writing data in it.

It is important that the swing (displacement) of the mechanical arm be controlled during these operations for preventing possible damage to the heads when the arm reaches the stop position on the parking ramp, or when bringing the heads onto the disk.

A dedicated control circuit controls the translation speed of the mechanical arm moved by the VCM motor during ramp loading and unloading operations. According to a known technique for controlling the speed of a VCM, the speed of the mechanical arm is measured by optical encoders, as disclosed in the U.S. Pat. No. 5,455,723.

The speed of the mechanical arm may also be measured by sensing the back electromotive force (BEMF) induced in the motor winding by the arm motion The back electromotive force that is generated by the arm motion is generally proportional to the translation speed of the arm. This back electromotive force may be measured by sensing the voltage on the nodes of the motor winding when the motor winding is in a high impedance state (tristate), as disclosed in U.S. Pat. No. 6,542,324.

In a discontinuous functioning mode, the output stage that powers the motor alternates conduction phases, during which the motor is substantially connected to the supply line and off-phases during which the motor is placed in a high impedance state (tristated). With $T_{ON}$ being the duration of a generic conduction state and $T_{OFF}$ being the duration of a generic period during which the motor is tristated, no current circulates in the winding for a time $T_{OFF}$ and the voltage measured at the terminals of the motor is theoretically equal to the back electromotive force (BEMF)

A control system of a VCO that implements this method is shown in FIG. 1 It allows control of the motor either in a voltage mode or in a current mode. Control circuitry, not depicted in the figure, controls the switches T1, T2, T3 and T1 of the power stage through control signals The operational amplifier senses the back electromotive force BEMF induced in the winding of the VCM by sensing the voltage at its terminals when all the switches of the power stage are open.

A drawback of this technique is that it is necessary to wait for a minimum time $T_{OFFMIN}$ before the voltage at the terminals approximates with sufficient precision the induced back electromotive force BEMF. Tests carried out on a VCM showed that, from the instant in which the motor is tristated, there is a transient component of the voltage on the motor that could affect the sensing of the BEMF.

This effect is illustrated by the waveforms of FIGS. 2 and 3, which show time graphs of the currents and of the voltages on the nodes OUT_P and OUT_M during the intervals $T_{ON}$ and $T_{OFF}$, in two different driving conditions of the VCM. The scales of the current and of the voltage are respectively 200 mA/div and 5 V/div, while the time-scales are 50 μs/div and 10 μs/div for the graphs of FIGS. 2 and 3, respectively.

Even when the current transient has decayed, there persists a voltage transient that typically lasts several tenths of microseconds longer, and that may alter the sensing of the BEMF. By comparing the graphs of FIGS. 2 and 3, the amplitude of this prolonged voltage transient depends upon the current that has flown through the winding during the preceding conduction phase.

To sense correctly the BEMF induced in the winding of the VCM, it is necessary that the motor be tristated for a time $T_{OFFMIN}$ sufficiently long to let the transient voltage decay. These phenomena limit the maximum switching frequency of the control signals of the switches of the driving stage, and as a consequence, the precision of control of the speed of the motor. This maximum switching frequency typically ranges between 1 kHz and 3 kHz, thus acoustic noise is generated.

SUMMARY OF THE INVENTION

An object of the invention is to provide a method for sensing the BEMF induced in a VCM that would permit an increase in the switching frequency of the control signals of the driving stage beyond the acoustic band.

The transient voltage disturbance may be due to the fact that when entering an off-phase, the VCM operates like a transformer, and the secondary circuit of which is represented by the permanent magnet of the VCM. This transient voltage disturbance, sensed as soon as the motor enters an off-phase, could be due to the variation of magnetic flux generated by the permanent magnet of the VCM because of the perturbation of magnetic flux induced by the current circulating in the winding. Substantially, this phenomenon may be explained as being due to a mutual inductance between the winding and the permanent magnet of the VCM.

According to the method of the invention for sensing a BEMF, the motor is controlled to force a current pulse, opposite to that circulating in the winding, immediately before tristating the motor. In this way the variation of magnetic flux of the permanent magnet is compensated. As a result, the transient voltage disturbance decays more rapidly, thus allowing for a quicker sensing of the BEMF. Therefore, it is possible to reduce the minimum duration $T_{OFF_{MIN}}$ of the tristate phases, and thus, to increase the switching frequency of the control signals of the driving stage of the motor.

BRIEF DESCRIPTION OF THE DRAWINGS

The invention will be described referring to the attached drawings, wherein:

FIGS. 2 and 3 are respectively sample graphs of the current flowing through the VCM and of the corresponding voltages on the VCM terminals for a peak current of 0.55 A and 0.3 A in accordance with the prior art;

FIGS. 4a and 4b are respectively sample graphs of the current flowing through the VCM and of the voltage drop thereon in accordance with the prior art and the invention.

DETAILED DESCRIPTION OF THE PREFERRED EMBODIMENTS

The method of the invention, similar to the method disclosed in U.S. Pat. No. 6,542,324 and which is incorporated herein by reference in its entirety and is assigned to the current assignee of the present invention, senses the back electromotive force induced in the winding when the motor is tristated. To shorten as much as possible the off-phase and thus be able to increase the switching frequency of the driving stage, the switches of the stage are controlled such that during a final portion of the conduction phase, immediately before entering the successive off-phase, a current opposite to that flowing during an initial fraction of the conduction phase is forced through the winding.

Figure 1:
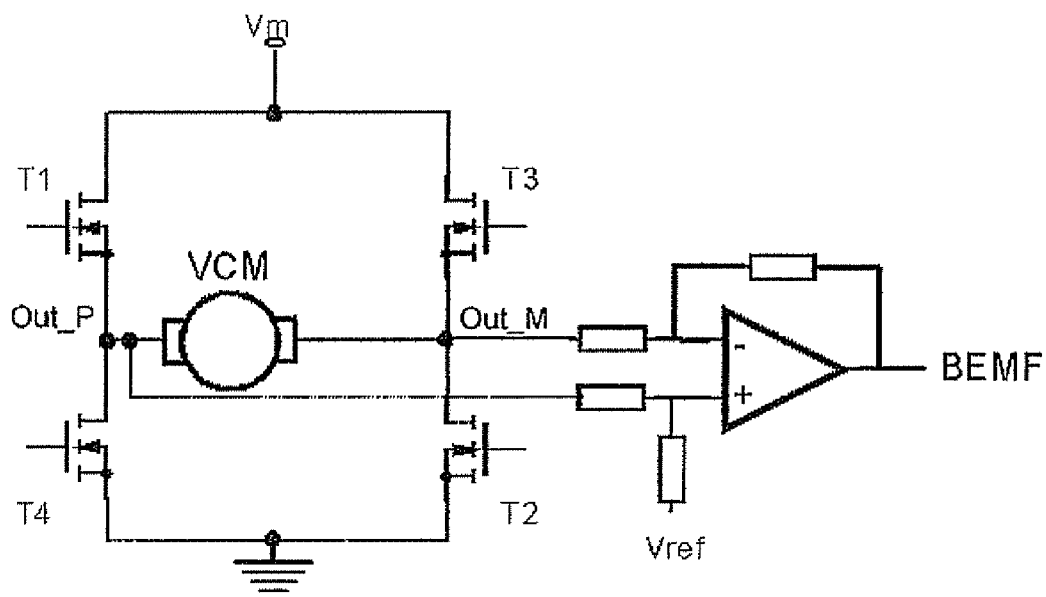
FIG. 1 shows a control circuit of a voice coil motor with a back electromotive force sensing amplifier in accordance with the prior art.
Figure 2:
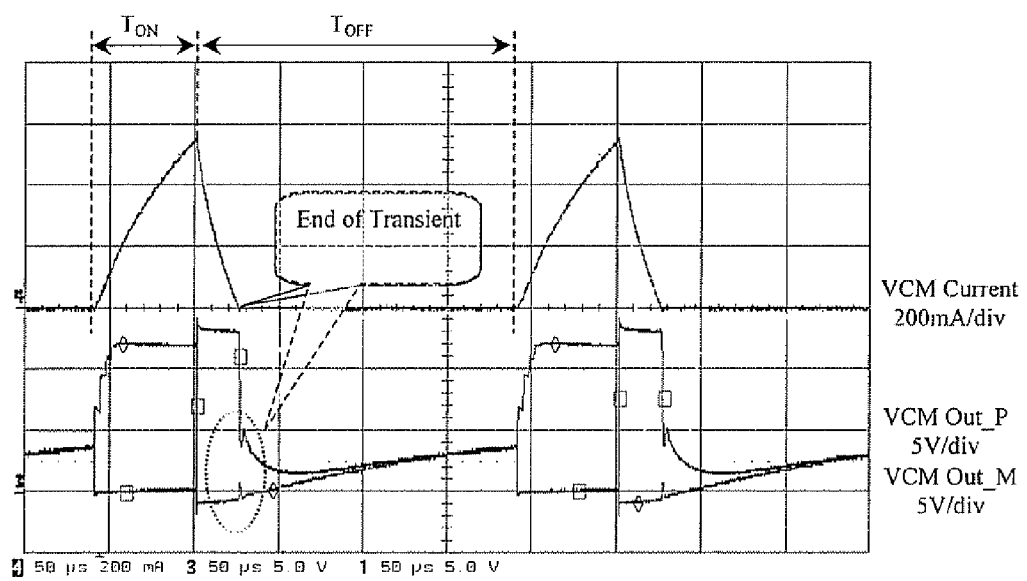

A current pulse opposing the drive current flowing through the VCM is forced in the winding to invert the direction of flow of the resultant current flowing through the winding during a final portion of the conduction phase. This may be implemented with the same control system of FIG. 1 by counter-biasing the motor for a very short time interval during a final fraction of the conduction phase immediately before starting the off-phase.

As a result, the above described effect of variation of the magnetic flux of the permanent magnet of the VCM is compensated, thus allowing the time interval to be shortened after which it is possible to sense with good precision the BEMF.

FIGS. 4a and 4b compare sample graphs of the voltage and of the current flowing through the motor controlled according to the prior art (FIG. 4a) and according to the method of the invention (FIG. 4b).

FIG. 4a illustrates a graph of the current flowing through the VCM and of the voltage drop on it in a conduction phase and during an off-phase, according to a traditional control method where the current in the VCM is not inverted. It is observed that the transient voltage disturbance decays to a null value after 50 μs, and after this time has elapsed the voltage drop on the motor equals the back electromotive force BEMF.

FIG. 4b illustrates a graph corresponding to that of FIG. 4a, obtained by driving the motor according to the method of the invention. The conduction period may ideally be divided in an initial portion, during which a current in a direction of flow such to impart a desired acceleration to the motor is forced therethrough, and in a short final portion during which the direction of flow of the current is inverted, before tristating the motor.

In this case, it has been experimentally found that the transient voltage disturbance decays to a null value in about 20 μs. This is much faster than the time required in the case of FIG. 4a.

The larger the amplitude of the inverse current peak that is imposed, the larger is the reverse motor torque that is generated and that decrements the torque that has been imparted to the motor during the initial portion of the conduction phase.

The duration and the peak amplitude of such a reverse current pulse that is applied may be optimized in consideration of the functioning conditions and characteristics of the motor. Of course, optimization allows a quickened sensing of the BEMF without excessively altering the control of the motor. Tests carried out by the applicants showed that it is preferable to control the VCM such to make the area below the graph (electric charge) corresponding to the reversed current pulse at the end of a conduction phase smaller than 25% of the area below the graph (electric charge) corresponding to the direct current portion of the conduction phase. If this percentage limit is exceeded, the control of the VCM is excessively modified without any significant advantages in term of reducing the guard period.

With the method of the invention it is even possible to double the switching frequency of the control signals of the power stage of a voice coil motor, raising it above the acoustic band and to control with enhanced precision the displacement of a mechanical arm of a hard disk drive.

The invention claimed is:

1. A method for sensing a back electromotive force induced in a winding of a voice coil electro-mechanical actuator controlled in a discontinuous mode by alternating conduction phases to off-phases, the method comprising:
   sensing voltage at terminals of the winding during an off-phase; and
   driving the winding during a conduction phase immediately preceding the off-phase to invert, during a final portion of the conduction phase before entering an off-phase, a direction of flow of the current through the winding.

2. A method according to claim 1, wherein an electrical charge being conducted through the winding during the final portion of the conduction phase is less than a fourth of the electrical charge being conducted therethrough during a preceding portion of the conduction phase.

3. A method according to claim 1, wherein the voice coil electro-mechanical actuator is configured for moving an arm that carries read/write heads of a hard disk.

4. A method for controlling a voice coil motor (VCM) in a discontinuous mode through a power stage of the VCM controlled by externally generated control signals, the method comprising:
   sensing a back electromotive force induced in a winding of the VCM controlled in the discontinuous mode by alternating conduction phases to off-phases, the sensing comprising
   sensing voltage at terminals of the winding during an off-phase, and
   driving the winding during a conduction phase immediately preceding the off-phase to invert, during a final portion of the conduction phase before entering an off-phase, a direction of flow of the current through the winding; and generating the external control signals for the power stage as a function of the sensed back electromotive force.

5. A method according to claim 4, wherein an electrical charge being conducted through the winding during the final portion of the conduction phase is less than a fourth of the electrical charge being conducted therethrough during a preceding portion of the conduction phase.

6. A method according to claim 4, wherein the VCM is configured for moving an arm that carries read/write heads of a hard disk.

7. A device comprising:
a voice coil electro-mechanical actuator comprising a winding; and
a control circuit for said voice coil electro-mechanical actuator for sensing a back electromotive force induced in the winding of said voice coil electro-mechanical actuator being controlled in a discontinuous mode by alternating conduction phases to off-phases, said control circuit performing sensing voltage at terminals of said winding during an off-phase; and
driving said winding during a conduction phase immediately preceding the off-phase to invert, during a final portion of the conduction phase before entering an off-phase, a direction of flow of the current through the winding.

8. A device according to claim 7, wherein an electrical charge being conducted through said winding during the final portion of the conduction phase is less than a fourth of the electrical charge being conducted therethrough during a preceding portion of the conduction phase.

9. A device according to claim 7, wherein the voice coil electro-mechanical actuator and control circuit are configured for moving an arm that carries read/write heads of a hard disk.

* * * * *

UNITED STATES PATENT AND TRADEMARK OFFICE
CERTIFICATE OF CORRECTION

PATENT NO. : 7,215,094 B2
APPLICATION NO. : 11/381432
DATED : May 8, 2007
INVENTOR(S) : Maiocchi et al.

It is certified that error appears in the above-identified patent and that said Letters Patent is hereby corrected as shown below:

Column 1, Line 21        Delete: "magnet"
                         Insert -- magnet. --

Column 1, Line 53        Delete: "motion"
                         Insert -- motion. --

Column 2, Line 3         Delete: "VCO"
                         Insert -- VCM --

Column 2, Line 7         Delete: "T1"
                         Insert -- T4 --

Signed and Sealed this

Eighteenth Day of September, 2007

JON W. DUDAS
*Director of the United States Patent and Trademark Office*